(12) United States Patent
Mack et al.

(10) Patent No.: US 12,005,400 B2
(45) Date of Patent: Jun. 11, 2024

(54) HIGH RECOVERY VARIABLE VOLUME REVERSE OSMOSIS MEMBRANE SYSTEM

(71) Applicants: Veolia Water Solutions & Technologies Support, Saint-Maurice (FR); Bernard Roy Mack, Natick, MA (US); Kevin Rollings, Vandalia, OH (US)

(72) Inventors: Bernard Roy Mack, Natick, MA (US); Kevin Rollings, Vandalia, OH (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 694 days.

(21) Appl. No.: 17/271,237

(22) PCT Filed: Aug. 13, 2019

(86) PCT No.: PCT/US2019/046270
§ 371 (c)(1),
(2) Date: Feb. 25, 2021

(87) PCT Pub. No.: WO2020/046569
PCT Pub. Date: Mar. 5, 2020

(65) Prior Publication Data
US 2021/0322929 A1     Oct. 21, 2021

Related U.S. Application Data

(60) Provisional application No. 62/724,107, filed on Aug. 29, 2018.

(51) Int. Cl.
*B01D 65/08* (2006.01)
*B01D 61/02* (2006.01)
(Continued)

(52) U.S. Cl.
CPC .......... *B01D 65/08* (2013.01); *B01D 61/025* (2013.01); *B01D 61/06* (2013.01); *B01D 61/08* (2013.01);
(Continued)

(58) Field of Classification Search
CPC ........ B01D 2311/08; B01D 2311/2512; B01D 2311/2523; B01D 2313/083;
(Continued)

(56) References Cited

U.S. PATENT DOCUMENTS

| 4,983,301 A | 1/1991 | Szücz et al. |
| 7,695,614 B2 | 4/2010 | Efraty |

(Continued)

FOREIGN PATENT DOCUMENTS

| AR | 002410 A1 | 3/1998 |
| AR | 087781 A1 | 4/2014 |

(Continued)

*Primary Examiner* — Terry K Cecil
(74) *Attorney, Agent, or Firm* — COATS & BENNETT, PLLC

(57) ABSTRACT

A high recovery variable volume reverse osmosis system where the volume of concentrate cycled through the RO system is reduced in response to recovery levels increasing. By reducing the volume of concentrate cycled through the RO system, this reduces the cycle time of highly saturated concentrate passing through the RO system. Reducing the cycle time of concentrate passing through the RO system tends to minimize or reduce membrane scaling.

18 Claims, 4 Drawing Sheets

(51) Int. Cl.
*B01D 61/06* (2006.01)
*B01D 61/08* (2006.01)
*B01D 61/10* (2006.01)
*B01D 61/12* (2006.01)
*C02F 1/44* (2023.01)

(52) U.S. Cl.
CPC .............. *B01D 61/10* (2013.01); *B01D 61/12* (2013.01); *C02F 1/441* (2013.01); *B01D 2311/08* (2013.01); *B01D 2311/2512* (2022.08); *B01D 2311/2523* (2022.08); *B01D 2313/083* (2013.01); *B01D 2313/18* (2013.01); *B01D 2313/243* (2013.01); *B01D 2313/246* (2013.01); *B01D 2313/30* (2013.01); *B01D 2313/501* (2022.08); *C02F 2301/08* (2013.01); *C02F 2303/22* (2013.01)

(58) Field of Classification Search
CPC .......... B01D 2313/18; B01D 2313/243; B01D 2313/246; B01D 2313/30; B01D 2313/501; B01D 2313/502; B01D 61/025; B01D 61/06; B01D 61/08; B01D 61/10; B01D 61/12; B01D 65/08; C02F 1/441; C02F 2301/08; C02F 2303/22
See application file for complete search history.

(56) References Cited

U.S. PATENT DOCUMENTS

| | | |
|---|---|---|
| 2012/0145636 A1 | 6/2012 | Hooley et al. |
| 2017/0239620 A1 | 8/2017 | Warsinger et al. |
| 2017/0334737 A1 | 11/2017 | Govindan et al. |
| 2017/0334747 A1 | 11/2017 | Cohen et al. |
| 2018/0008934 A1 | 1/2018 | Shmidt et al. |

FOREIGN PATENT DOCUMENTS

| | | |
|---|---|---|
| CN | 107250063 A | 10/2017 |
| EP | 3214807 A1 | 9/2017 |
| IL | 251499 B | 2/2019 |
| JP | H01502496 A | 8/1989 |
| JP | 2012206073 A | 10/2012 |
| WO | 03013704 A2 | 2/2003 |
| WO | 2006001007 A2 | 1/2006 |
| WO | 2013034396 A1 | 3/2013 |
| WO | 2017192907 A1 | 11/2017 |
| WO | 2018128757 A2 | 7/2018 |
| WO | 2018129442 A1 | 7/2018 |

HIGH RECOVERY VARIABLE VOLUME REVERSE OSMOSIS MEMBRANE SYSTEM

FIELD OF THE INVENTION

The present invention relates to high recovery reverse osmosis (RO) membrane systems.

BACKGROUND

Scaling of membranes in RO systems is a serious problem. Scaling occurs when inorganic salts, such as calcium carbonate, calcium sulfate, barium sulfate, etc. in the concentrate precipitate and deposit onto the surfaces of the membranes. Scaling causes the membranes to become plugged. Plugged membranes result in higher energy costs and shorter life spans for the membranes. In addition, scaled membranes require frequent cleaning (online and offline) with some cleaning processes entailing chemical cleaning. The cleaning and downtime associated with cleaning is expensive.

RO systems typically operate at 50-75% recovery. High recovery on the order of 80-95% is difficult to achieve on a consistent basis. At these high recovery rates, the concentrate being cycled through the RO system becomes supersaturated with scaling constituents. The continuous cycling of the concentrate supersaturated with scaling constituents over a significant period of time often results in the scaling of the RO membranes. This is often discussed in the context of what is referred to as induction time for scaling. If the RO concentrate is supersaturated and is continuously cycled through the RO system for a time longer than the induction time for scaling, then there is a likelihood that scaling of the RO membranes will occur. While chemicals can be used to slow the induction time of scaling these chemicals have a limit.

Therefore, there has been and continues to be a need for high recovery RO systems designed to minimize or reduce membrane scaling.

SUMMARY OF THE INVENTION

The present invention relates to a variable volume semi-batch RO system and process where the volume of the RO system is reduced as recovery levels increase. This effectively reduces the concentrate cycle time through the RO system which in turn reduces the likelihood of membrane scaling. Expressed differently, the RO system and process is designed such that at relatively high recovery levels (for example, 80-98%), the concentrate cycle time is less than the induction time for scaling.

In one embodiment, the RO system includes a concentrate receiving unit having two tanks that receive and hold concentrate produced by an RO unit. At relatively low recovery levels (for example, less than 80%), the entire or substantially the entire volume of concentrate in the concentrate receiving unit is cycled through the RO system. However, as the recovery level increases and the concentrate becomes more concentrated with scaling constituents, one of the tanks is isolated from the RO system, thereby reducing the volume of the RO system. By reducing the volume of the RO system, the concentrate cycle time is reduced. This reduces the time at which the high saturation levels of scaling constituents exists in the RO system.

In another embodiment, the concentrate receiving unit comprises a pipe network that includes a series of strategically placed valves. By opening and closing various valves, the volume of concentrate in the pipe network that is cycled through the RO system is varied. At relatively low recovery levels, the valves are set such that a relatively large volume of concentrate in the pipe network is cycled through the RO system. As recovery levels and saturation of the concentration increases, the valves are manipulated to reduce the volume of concentrate from the pipe network that is cycled through the RO system. This reduces the cycle time of the more saturated concentrate and hence reduces or minimizes membrane scaling.

Other objects and advantages of the present invention will become apparent and obvious from a study of the following description and the accompanying drawings which are merely illustrative of such invention.

DESCRIPTION OF EXEMPLARY EMBODIMENTS

RO system recovery depends on the number of times (cycles) that the feedwater passes through an RO unit. If an RO system is operating at 50% recovery per pass, for example, the time required for stepping up the concentration depends on system volume and overall recovery depends on the number of cycles that the feedwater makes through the RO system. The following example illustrates this principle.

For 80% recovery, the feedwater passes around the system five cycles.

For 90% recovery, the feedwater passes around the system ten cycles.

For 95% recovery, the feedwater passes through the system 20 cycles.

For 98% recovery, the feedwater passes through the system 50 cycles.

Thus, if the cycle time of a particular system is two minute, then for a 98% recovery, the total time is 100 minutes. For a 95% recovery, the total time is 40 minutes. These are relatively long cycle times and can exceed the induction time for scaling.

This suggests that by providing an RO system with a variable volume that membrane scaling can be reduced or minimized. By employing a variable volume, the process can be designed to cycle a relatively large volume of concentrate through the RO system when the recovery level is relatively low (for example, less than 80%). Further, as the recovery level increases to 80% and beyond, then the process is designed to reduce the volume of concentrate cycled through the RO system. This means that the system's exposure to highly saturated or supersaturated concentrate is reduced. For any volume and recovery rate, the process aims to control concentrate cycle time to less than the induction time for scaling.

Figure 1:
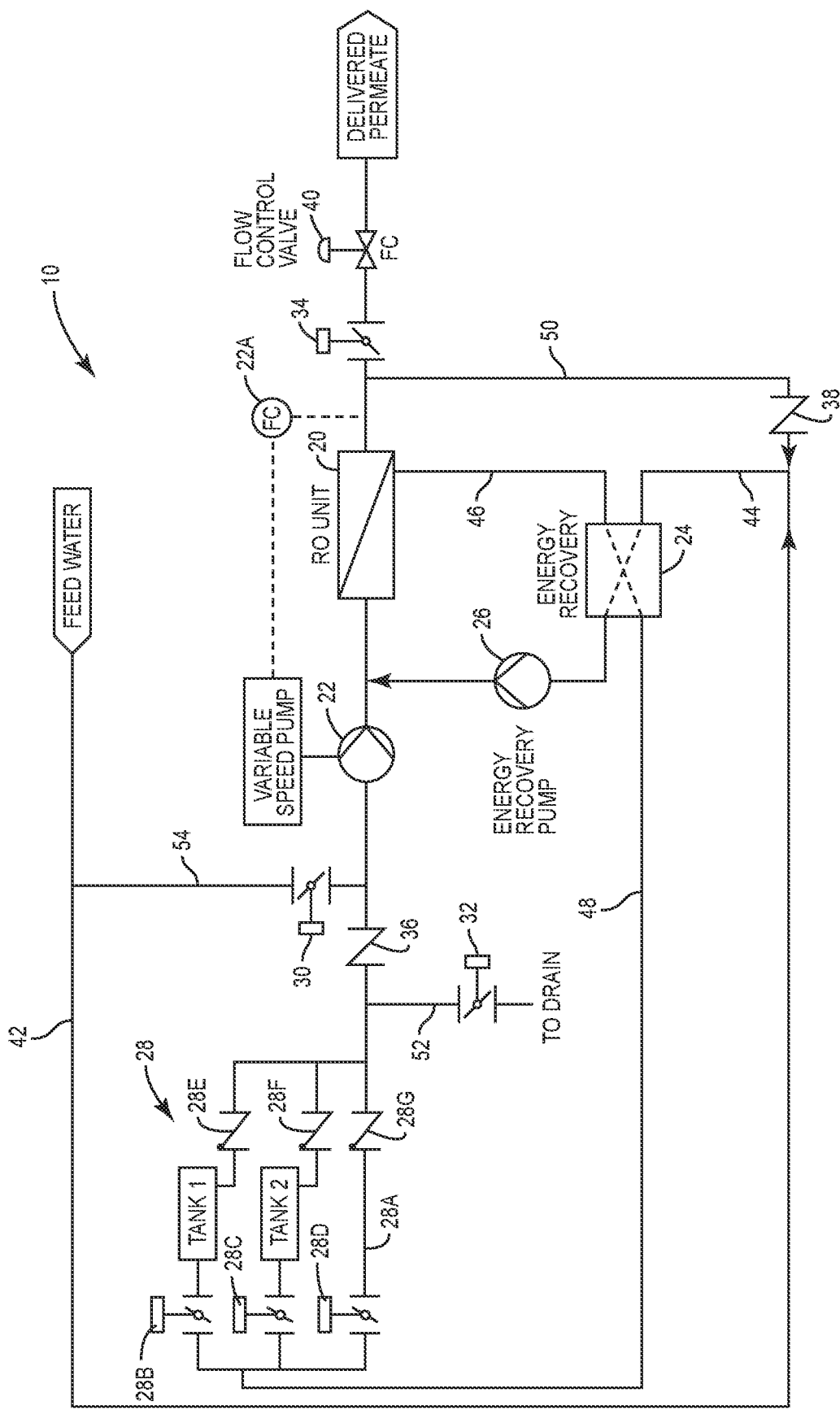
FIG. 1 is a schematic illustration of a variable volume high recovery RO system.

With further reference to the drawings and particularly FIG. 1, a water treatment system is shown therein indicated generally by the numeral 10. First, the basic components of the water treatment system 10 will be described and there-after the method or process carried out by the water treatment system will be discussed.

Water treatment system 10 includes one or more membrane separation units. In the embodiment shown in FIG. 1, the membrane separation unit comprises a reverse osmosis unit 20. The term "reverse osmosis unit" or "RO unit" is expressly defined herein as encompassing a nanofiltration system or unit. Reverse osmosis unit 20 can include a single stage or a two-stage RO unit. Upstream of the RO unit 20 is a high pressure variable speed pump 22. Water treatment system 10 includes an energy recovery unit 24. As will be explained below, both the concentrate from the reverse osmosis unit 20, and in some cases the feedwater to the reverse osmosis unit, pass through the energy recovery unit 24. Energy associated with the concentrate leaving the RO unit 20 is effectively transferred to the feedwater passing through the energy recovery unit 24. Operatively connected between the energy recovery unit 24 and the inlet side of the RO unit 20 is an energy recovery pump 26. Energy recovery pump 26 is operative to pump the feedwater leaving the energy recovery unit 24 to the RO unit 20.

Upstream from the high pressure pump 22 is a variable volume concentrate receiving unit 28 which receives concentrate produced by the RO unit 20. Concentrate receiving unit 28 is operated under a relatively low pressure. While the pressure can vary in the concentrate receiving unit 28, the pressure therein in a preferred embodiment is maintained at a lower pressure than the pressure on the outlet side of the pressure pump 22. In one example, the pressure in the concentrate receiving unit 28 is maintained at approximately 30 psi. Subsequently herein the concentrate receiving unit 28 and the process of varying the volume of the concentrate cycled through the RO system is discussed in more detail.

Water system 10 includes a number of flow control valves for controlling the flow of feedwater, concentrate and permeate through the system. In the embodiment illustrated in FIG. 1, the water treatment system includes automatic control valves 30, 32 and 34. In addition, there is provided check valves 36 and 38. Check valve 36 only permits flow from left to right and check valve 38 only permits flow from right to left, as viewed in FIG. 1.

Water treatment system 10 is designed to provide a permeate stream to a customer or to a selected delivery point. Note in FIG. 1 the notation "delivered permeate". Just upstream of that is a flow control valve 40 that is disposed downstream of the automatic control valve 34. As will be discussed below, by selectively adjusting the flow control valve 40, one can control the flow rate of the permeate delivered by the system.

Water treatment system 10 is designed to operate in two modes. The first mode is referred to as a normal operating mode. The second mode is referred to as a concentrate discharge or drain mode. Initially, in the first normal operating mode, valves 30, 32 and 34 close. A pressurized feedwater, that is pressurized water, is directed into the system via line 42. Feedwater in line 42 is prevented from passing through check valve 38. Consequently, the pressurized feedwater enters line 44 and passes through the energy recovery unit 24. Feedwater exiting the energy recovery unit 24 is pumped by the energy recovery pump into and through the RO unit 20. This produces a permeate and a concentrate. Since at this point in time the automatic control valve 34 is closed, the permeate leaving the reverse osmosis unit 20 is directed through line 50, through check valve 38 where the permeate mixes with the feedwater in line 42 and the mixture is directed through the energy recovery unit 24 where the energy recovery pump 26 pumps the same into and through the RO unit 20. This flow pattern for the feedwater and the permeate continues for some time. Meanwhile, the concentrate produced by the RO unit 20 is directed through line 46 and through the energy recovery unit 24 into line 48 that delivers the concentrate to the variable volume concentrate receiving unit 28. As noted above, the concentrate received by the concentrate receiving unit 28 is held or maintained under a relatively low pressure compared to the pressure existing on the outlet side of the high pressure pump 22. Concentrate held in the concentrate receiving unit 28 is at a sufficient pressure to induce the concentrate to pass from the concentrate receiving unit 28 through check valve 36 to the high pressure pump 22 which pumps the concentrate into and through the RO unit 20. It is appreciated that the concentrate exiting the high pressure pump 22 mixes with the effluent from the energy recovery pump 26 and the total mixture is pumped into and through the RO unit 20.

During the initial period of the first mode of operation, the quality of the permeate is sensed or tested. Once the quality of the permeate produced by the reverse osmosis unit 20 reaches an acceptable quality, then the automatic control valve 34 is opened. The downstream flow control valve 40 is set to deliver a certain permeate flow rate to a customer or to a downstream location. It should be noted that the high pressure pump 22 is controlled by a flow controller 22A such as a PLC and in one embodiment is controlled to maintain a constant flow of permeate from the reverse osmosis unit 20. It follows that the total permeate flow exiting the reverse osmosis unit 20 is measured and used by the controller in order to control the variable speed high pressure pump 22 so that the total permeate flow is generally constant. The flow rate of the permeate from the reverse osmosis unit 20 may exceed the flow rate of permeate that passes through the flow control valve 40 to the customer. This means that a portion of the produced permeate is recycled through the reverse osmosis unit 20 via lines 50 and 44 and on through the energy recovery unit 24 to where it is pumped back to the reverse osmosis unit by the energy recovery pump 26.

Now turning to the concentrate receiving unit 28, note in FIG. 1 where the concentrate receiving unit includes tank 1, tank 2 and a bypass line 28A. The tanks and bypass line 28A are disposed in parallel relationship. Upstream of tank 1 is an automatic control valve 28B and upstream of tank 2 is an automatic control valve 28C. In addition, bypass line 28A includes an automatic control valve 28D. Downstream from tank 1 is a check valve 28E. Downstream of tank 2 is a check valve 28F. Also, bypass line 28A includes a check valve 28G. Check valves 28E, 28F and 28G prevent the flow of liquid from right to left as viewed in FIG. 1.

System 10 is designed to vary the volume of concentrate from the concentrate receiving unit 28 that is cycled through the system based on the recovery level being experienced in the system. Generally at low recovery levels the entire volume or substantially the entire volume of concentrate in the concentrated receiving unit 28 is cycled through the RO system. As the recovery level increases, the system is designed to reduce the volume of concentrate cycle through the system. As discussed above, at high recovery levels, the concentrate will be highly saturated or even supersaturated with scaling constituents. By reducing the volume of concentrate being cycled through the system at these high recovery levels, it follows that the cycle time is reduced which in turn reduces or minimizes scaling of the RO unit 20.

One example may be helpful to understand this principle. In this example, the system 10 is initially operated at a relatively low recovery level. In this example, a relatively low recovery level is less than 80% recovery. Here tanks 1 and 2 are included in the circuit but bypass line 28 is closed. This means that valves 28B and 28C are open and valve 28D is closed. Thus the entire volume of concentrate in tanks 1 and 2 is cycled through the system 10 at this relatively low recovery level.

Once the system reaches an 80% recovery level, for example, one of the tanks is isolated from the system. In this example, assume tank 1 is isolated. Once isolated, the concentrate in tank 1 is offline and not cycled through the system. Now only the concentrate in tank 1 is cycled through the system. Hence the volume of concentrate being cycled through the system is reduced. This reduces the cycle time that the concentrate passes through the system.

Once the recovery level reaches 95%, the bypass valve 28D is open and tank 2 is isolated from the circuit. Now both tanks 1 and 2 are isolated from the circuit and only the concentrate passing through bypass line 28 is cycled through the system. This achieves a further reduction in the volume of concentrate being cycled through the system.

Eventually a final or target recovery level is achieved. In this example, the final recovery level is set at 98%. Once a 98% recovery level is achieved, the first mode of operation comes to an end and the system is switched to a second mode of operation that entails draining concentrate in the concentrate receiving unit 28 from the system. This is explained more fully below.

Figure 2:
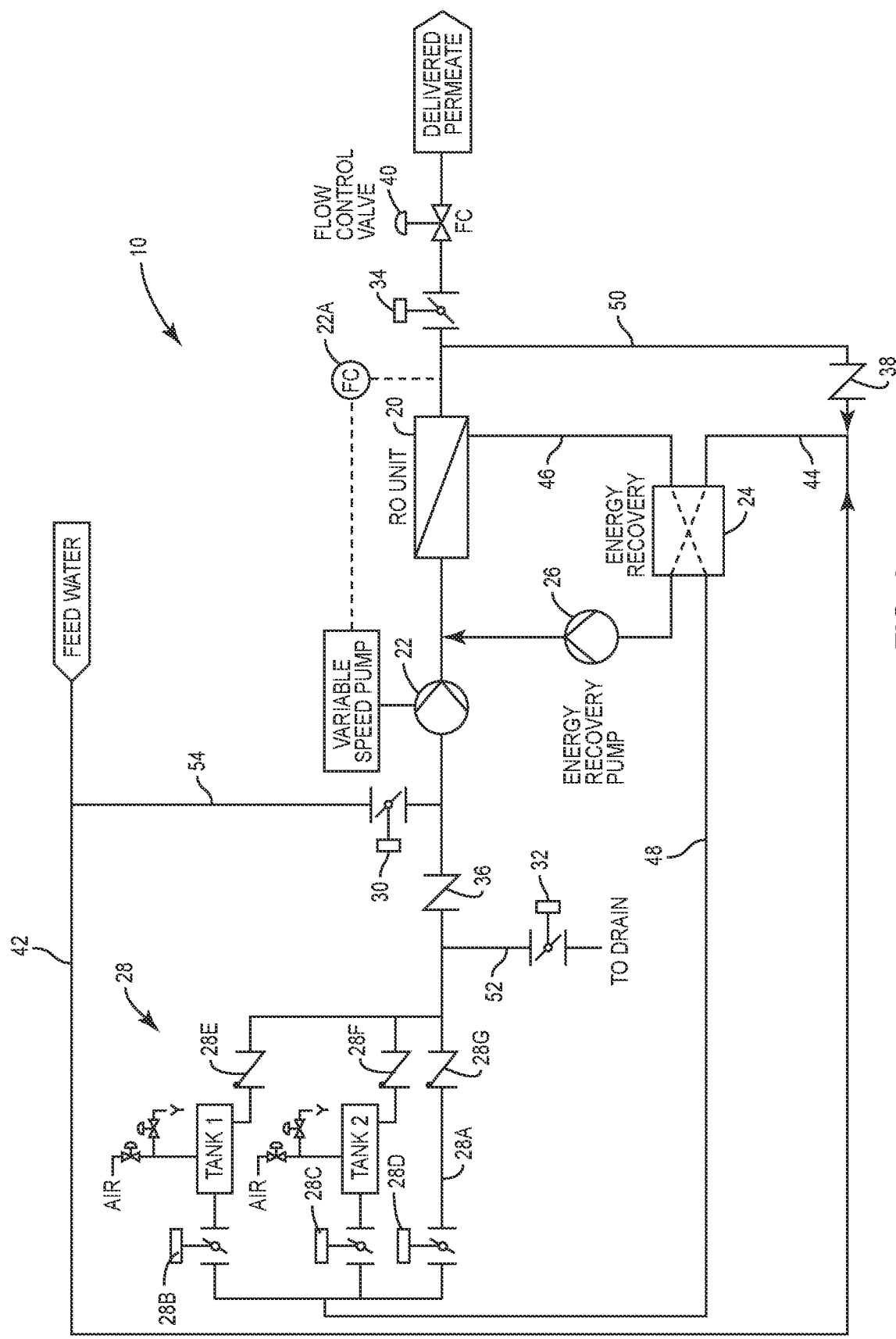
FIG. 2 is an alternative design for the variable volume RO system.

The concentrate receiving unit 28 of FIG. 2 is similar to FIG. 1 except that a compressed air source is operatively connected to each tank. In this embodiment, compressed air can be directed into either tank 1 or tank 2 and used to drive the concentrate therein from the tank into the recycle stream. When the targeted recovery is achieved, tanks 1 and 2 can be refilled by simply releasing the trapped air which induces concentrate into the tank.

Figure 3:
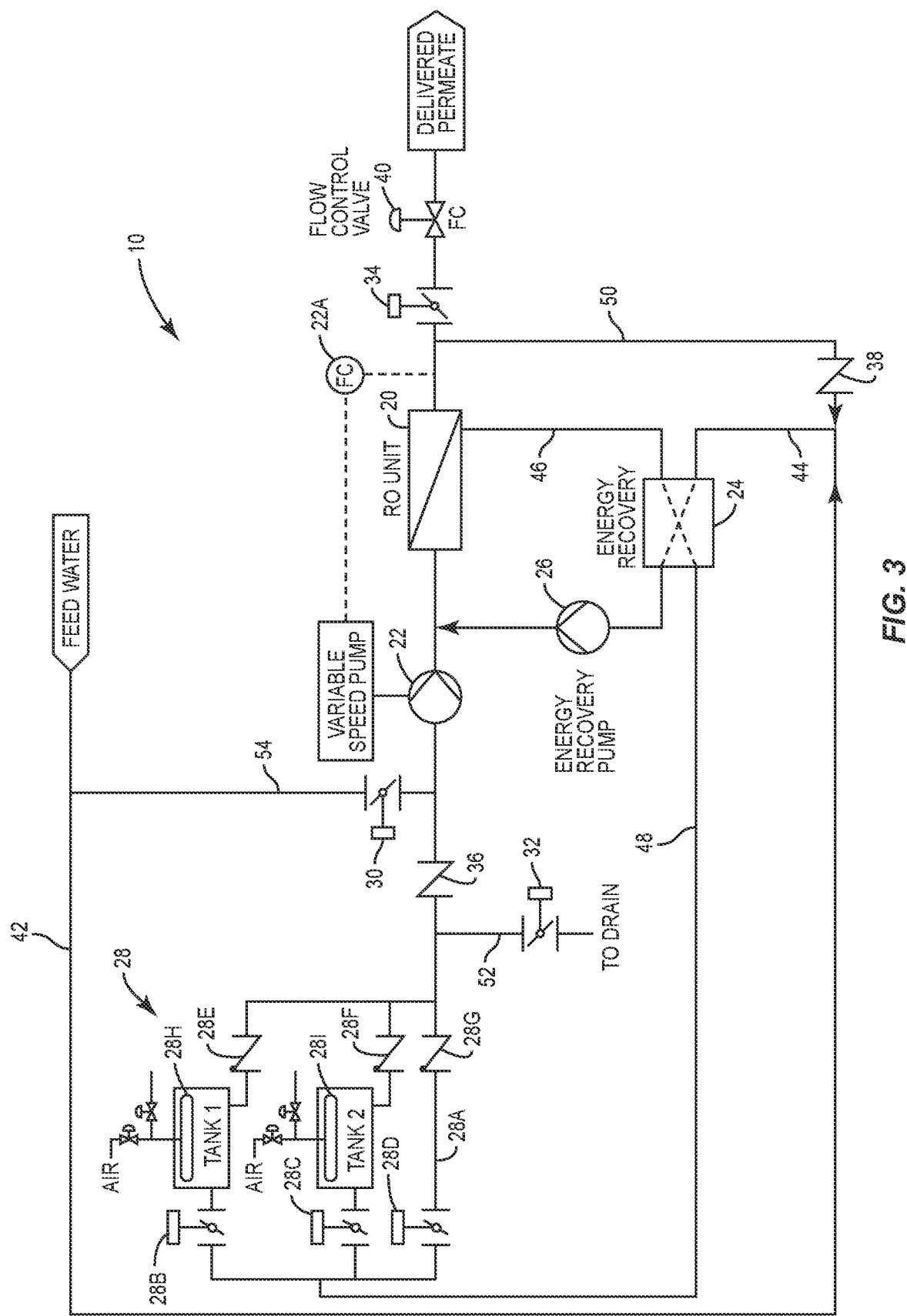
FIG. 3 is yet another alternative design for the variable volume RO system.

The concentrate receiving unit 28 of FIG. 3 is similar to the FIG. 2 design except that tank 1 and tank 2 are provided with air bladders 28H and 28I. Both air bladders 28H and 28I are operatively connected to a source of compressed air. Air bladders 28H and 28I use compressed air to inflate the bladders and displace concentrate from the respective tanks once the system achieves the targeted recovery level. Once tanks 1 and 2 return to service, the air bladders 28H and 28I slowly release air in order to induce less saturated concentrate into tanks 1 and 2.

Figure 4:
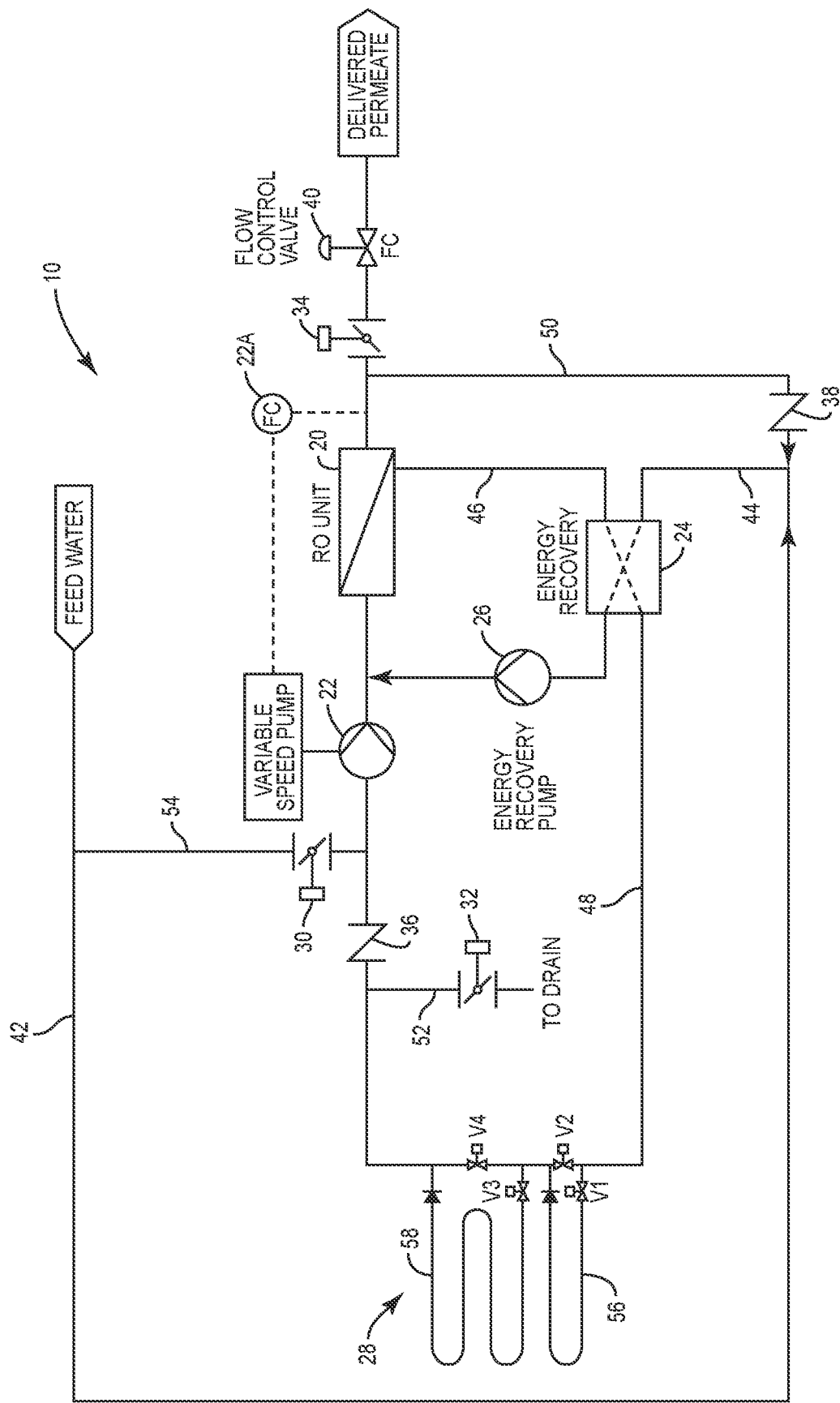
FIG. 4 depicts a variable volume RO system including a concentrate receiver unit comprising a piping network.

FIG. 4 illustrates another example of a variable volume concentrate receiving unit 28. In this case, the variable volume concentrate receiving unit 28 comprises a piping network that includes a series of automatic control valves, V1, V2, V3, and V4. There is provided a pair of branch pipe loops 50 and 52 operatively connected to concentrate line 48 that is in turn operatively connected in the energy recovery unit 24 and the high pressure pump 22. By strategically placing the automatic control valves in line 48 and in the pipe loops 50 and 52, the volume of concentrate cycled through the system can be automatically varied and controlled.

The following is a logic chart for controlling the automatic control valves V1, V2, V3 and V4 as the recovery level steps through three thresholds (x % recovery, y % recovery, and z % recovery). In one example, the x % recovery could be 85%, the y % recovery could be 90% and the z % recovery could be 95%, with an end cycle at 98% recovery.

|  | Valve 1 | Valve 2 | Valve 3 | Valve 4 | Drain |
|---|---|---|---|---|---|
| Initial Condition | O | C | 0 | C | C |
| After X % Recovery | C | O | O | C | C |
| After Y % Recovery | O | C | C | O | C |
| After Z % Recovery | C | O | C | O | C |
| Initiate End Cycle | O | C | O | C | C |
| After timer start flush | O | C | O | C | O |
| Return to initial condition | O | C | O | C | C |

Eventually the concentrate delivered to the variable volume concentrate receiving unit 28 will become so concentrated that discharge or drainage is required. Once this occurs, it is time to switch from the first mode of operation to a second mode of operation. There are various ways to measure the concentration of the concentrate. Various thresholds or set points can be established. One appropriate means is subjecting the concentrate to a conductivity test and once the conductivity has reached a set point, then the water treatment system will be automatically switched to the second mode of operation which again entails discharging or draining the concentrate from the concentrate receiving unit 28. In this second mode of operation, control valves 30 and 32 are open. The concentrate receiving unit 28 is held under low pressure. A portion of the concentrate will be induced to flow from the concentrate receiving unit 28 into line 52 and through automatic control valve 32. The concentrate being drained can be further treated or disposed of in appropriate ways. During this time, the pressurized feedwater is directed through line 54 and through automatic control valve 30 to the high pressure pump 22. Effectively, the high pressure pump 22 induces the feedwater to flow through line 54 into the inlet side of the high pressure pump 22. Thus, while a portion of the concentrate is being drained from the concentrate receiving unit 28, the water treatment system continues to operate with the feedwater being directly directed into the high pressure pump 22 and through the RO unit 20. Still even while a portion of the concentrate is being drained from the concentrate receiving unit 28, the RO unit 20 is producing a permeate stream and at least a portion of this permeate stream can be delivered through the flow control valve 40 to a downstream location and again a portion of the permeate can be recycled through line 50, check valve 38, line 44, energy recovery unit 24 and on through the energy recovery pump 26 and back to the reverse osmosis unit 20. Thus at the same time the RO unit 20 is continuing to produce a concentrate that is directed through line 46 through the energy recovery unit 24 and back to the concentrate receiving unit 28. In a preferred embodiment, the flow of concentrate through the concentrate receiving unit 28 is a plug flow so that the concentrate in the receiving unit is displaced by the lower concentrated water arising from treating the feedwater only or a blend of feedwater and permeate. During the second mode of operation, the concentrate in the concentrate receiving unit 28 becomes less concentrated. In other words, the fresh concentrate being delivered to the concentrate receiving unit 28 is, at least at the beginning, less concentrated than the concentrate in the concentrate receiving unit 28. In any event, the concentration of the concentrate is continuously monitored and at some point it is appropriate to switch the water treatment system back to the first mode or normal operating mode. That is, through a conductivity test, for example, the concentrate in the concentrate receiving unit 28 can be analyzed and when the conductivity reaches a set point that permits the first mode of operation, then the water treatment system 10 can be automatically switched to the first mode of operation by automatically controlling the various valves discussed. In the alternative, the second mode or concentrate discharge mode can be operated for a set period of time and after the lapse of the set period of time, the system can be switched back to the first mode of operation.

In some cases, the flow control valve 40 is continuously or intermittently controlled by the customer. For example, the customer may have a permeate holding tank downstream of the flow control valve 40. Flow control valve 40 can be varied and controlled through a level sensor in the permeate holding tank. Thus, if the level of permeate in the permeate holding tank is rising, this results in the flow control valve being actuated to restrict the flow through the valve. This would not necessarily require the flow control valve to be totally closed as would normally occur with some reverse osmosis systems. This will result in the recirculation of some portion of the permeate from 0% to 100%, depending on the customer's water usage or water demand. This mode of operation permits the RO system to provide an automatic variable permeate flow rate while maintaining a high level of water recovery which is generally not available due to the need to maintain a minimum crossflow velocity within the reverse osmosis modules.

There are many advantages to the water treatment system discussed above and particularly to providing a variable volume concentrate receiving unit. The variable volume concentrate receiving unit enables the cycling time for highly saturated concentrate to be controlled. In one example, at high recovery rates where the concentrate is highly saturated, by varying the volume of concentrate cycled through the system enables the cycle time to be controlled to less than the induction time for scaling. This reduces membrane scaling. In other words, the advantage of having the variable operating volume enables the time during which the high saturation levels exist within the system to be minimized or reduced while maximizing the time that the system operates under low pressure.

Attention is directed to WO 2018/0129442 which relates to a high recovery RO system. The disclosure of WO 2018/0129442 is expressly incorporated herein by reference. In particular, the concentrate receiving unit 28 described herein can be incorporated into the RO systems shown in FIGS. 2-4 of WO 2018/0129442.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A process for treating a feedwater in a variable volume reverse osmosis (RO) system that includes an RO unit that produces a permeate and a concentrate, and minimizing or reducing scaling of the RO unit by varying the volume of concentrate cycled through the RO system based on a recovery level of the RO unit, the process comprising:
   a. in a first mode of operation:
      i. pressurizing the feedwater and directing the feedwater through the RO unit to yield the permeate and the concentrate;
      ii. directing the concentrate from the RO unit to a variable volume concentrate receiving unit which comprises first and second concentrate accumulators forming a part of the RO system;
      iii. operating the RO unit at a first recovery level;
      iv. while operating the RO unit at the first recovery level, cycling a first volume of concentrate from the first and second concentrate accumulators of the variable volume concentrate receiving unit to and through the RO unit;
      v. after operating the RO system at the first recovery level, operating the RO unit at a second recovery level that is higher than said first recovery level;
      vi. while operating the RO unit at the second recovery level, isolating at least one of the concentrate accumulators and cycling a second volume of concentrate from the variable volume concentrate receiving unit to and through the RO unit, the second volume of concentrate being less than the first volume of concentrate;
      vii. wherein by reducing the volume of concentrate cycled through the RO unit at the second recovery level, concentrate cycle time through the RO unit is reduced, which in turn reduces or minimizes scaling of the RO unit;
      viii. while cycling the first and second volumes of concentrate through the RO unit, combining the feedwater with the first or second volume of concentrate such that the concentrate and feedwater are directed through the RO unit; and
   b. in a second mode of operation:
      i. after operating the RO system at said first and second recovery levels, removing at least a portion of the concentrate from the variable volume concentrate receiving unit to drain while still directing pressurized feedwater through the RO unit and directing concentrate from the RO unit to the concentrate receiving unit.

2. The process of claim 1 wherein the first and second concentrate accumulators of the concentrate receiving unit include first and second tanks for receiving and holding the concentrate; and wherein the process includes isolating at least one tank from the RO system while operating the RO system at said second recovery level.

3. The process of claim 1 wherein said first and second concentrate accumulators of the concentrate receiving unit comprise a piping system that includes a plurality of valves and the process includes manipulating the valves such that: (1) while the RO system is operating at said first recovery level, said first volume of concentrate is cycled through the RO system, and (2) while the RO system is operated at said second recovery level, said second volume of concentrate is cycled through the RO system.

4. The process of claim 1 wherein the first and second concentrate accumulators of the concentrate receiving unit include a piping network having a main segment, at least two loop segments branching off of the main segment, and a plurality of valves connected in the piping network; and wherein the method includes manipulating the valves in the piping network such that while operating at said second recovery level, only a portion of the concentrate contained in the piping network is cycled to and through the RO unit.

5. The method of claim 1 wherein the concentrate receiving unit includes a bypass line and the first and second concentrate accumulators include a first tank and a second tank; and wherein the bypass line, first tank and second tank are disposed in parallel relationship and wherein there is provided a series of valves that permit the bypass line, first tank, or second tank to be isolated from the RO system.

6. The method of claim 1 including operating the first recovery level at 80% or less and operating the second recovery level at greater than 80%.

7. A process for treating a feedwater in a variable volume reverse osmosis (RO) system that includes an RO unit that produces a permeate and a concentrate, and minimizing or reducing scaling of the RO unit by varying the volume of concentrate cycled through the RO system based on a recovery level of the RO unit, the process comprising:
 a. in a first mode of operation:
  i. pressurizing the feedwater and directing the feedwater through an RO unit to yield the permeate and the concentrate;
  ii. directing the concentrate from the RO unit to a concentrate receiving unit which comprises first and second concentrate accumulators;
  iii. in a first RO unit recovery level, directing the concentrate from the RO unit to said first and second accumulators and directing the concentrate from said first and second concentrate accumulators to a pump and pumping the concentrate from said first and second concentrate accumulators to and through the RO unit;
  iv. in a second RO unit recovery level that exceeds the first RO unit recovery level, isolating said first concentrate accumulator from the RO system and directing concentrate from the RO unit to the second accumulator and from said second concentrate accumulator to said pump and pumping the concentrate from said second concentrate accumulator to and through the RO unit;
  v. wherein by isolating said first concentrate accumulator from the RO system, the volume of concentrate cycled through the RO unit at the second RO unit recovery level is reduced, which in turn reduces concentrate cycle time, which in turn reduces or minimizes scaling of the RO unit;
 b. in a second mode of operation:
  i. removing a portion of a concentrate from the concentrate receiving unit to drain while still directing pressurized feedwater through the RO unit and directing concentrate from the RO unit to the concentrate accumulator unit.

8. The process of claim 7 wherein said concentrate receiving unit includes a bypass line and wherein in a third system recovery level that exceeds the second system recovery level, the process further includes isolating said first and second concentrate accumulators from the RO system and directing concentrate from the RO unit to and through said bypass line to said pump.

9. The process of claim 7 wherein after said first concentrate accumulator is isolated, emptying the first concentrate accumulator by directing compressed air into the first concentrate accumulator.

10. The process of claim 9 including trapping the compressed air in the first concentrate accumulator and refilling the first concentrate accumulator by releasing the trapped air in the first concentrate accumulator.

11. The process of claim 7 wherein at least one of said first and second concentrate accumulators includes an air bladder and the process includes displacing concentrate in at least one concentrate accumulator by directing compressed air into the bladder.

12. A variable volume reverse osmosis (RO) system configured to operate at multiple recovery levels and minimize or reduce scaling of the RO system by varying the volume of concentrate cycled through the RO system, the RO system comprising:
 an RO unit configured to produce a permeate and the concentrate and to operate at a first recovery level and at a second recovery level higher than the first recovery level;
 a pump disposed upstream of the RO unit;
 a permeate delivery line for directing at least a portion of the permeate to a delivery point;
 a permeate recycle line configured to recycle a portion of the permeate produced to the RO unit;
 a variable volume concentrate receiving unit forming a part of the RO system and including at least two separate concentrate containers and a series of valves associated with the containers, and where the RO system is configured to cycle concentrate from the two concentrate containers when the RO system is operating at the first recovery level and configured to isolate at least one of the concentrate containers from the RO system when the RO system is operating at the second recovery level to cycle a smaller volume of concentrate from the variable volume concentrate receiving unit than when the RO system is operating at the first recovery level;
 a concentrate line operatively connected between the RO unit and the concentrate receiving unit for directing the concentrate from the RO unit to the concentrate receiving unit;
 a feedwater line operative to direct feedwater into the RO system;
 a concentrate feed line connected between the concentrate receiving unit and the pump for directing the concentrate from the concentrate receiving unit to the pump; and
 a concentrate drain line configured to selectively drain concentrate from the concentrate receiving unit.

13. The system of claim 12 including an energy recovery device operatively associated with the concentrate line for recovering energy associated with the concentrate flowing therethrough.

14. The system of claim 12 wherein the two concentrate containers include two tanks disposed in parallel relationship.

15. The system of claim 14 wherein the concentrate receiving unit further includes a bypass line disposed in parallel relationship with the two tanks.

16. The RO system of claim 12 wherein the concentrate receiving unit includes a piping network having the series of valves strategically placed in the piping network to form at least the two concentrate containers.

17. The RO system of claim 12 wherein each concentrate container of the concentrate receiving unit includes a compressed air inlet line that enables compressed air to be directed into the respective containers to discharge the concentrate from the containers.

18. The RO system of claim 12 wherein each concentrate container is connected to an air bladder which in turn is connected to a source of compressed air and wherein the compressed air is utilized to displace concentrate from the respective concentrate containers once the RO system achieves a targeted recovery level.

* * * * *